United States Patent [19]

Marshall

[11] Patent Number: 4,662,654
[45] Date of Patent: May 5, 1987

[54] AUTOMATED CYLINDER CONNECTOR

[75] Inventor: Michael S. Marshall, Shoemakersville, Pa.

[73] Assignee: MG Industries, Valley Forge, Pa.

[21] Appl. No.: 730,646

[22] Filed: May 6, 1985

[51] Int. Cl.⁴ .............................................. F16L 37/10
[52] U.S. Cl. ...................... 285/18; 285/912; 285/39; 285/278; 415/92; 81/57.29; 279/1 K; 279/4
[58] Field of Search ...................... 285/18, 38, 39, 912, 285/332.1, 332.3, 278, 280; 81/16, 57.13, 57.29, 57.44, 3.2; 279/1 K, 4; 74/417, 423; 415/92

[56] References Cited

U.S. PATENT DOCUMENTS

| | | | |
|---|---|---|---|
| 977,472 | 12/1910 | Pilkington | 285/39 |
| 1,700,509 | 1/1929 | Moore | 285/280 |
| 1,735,991 | 11/1929 | Bennett | 285/912 |
| 1,736,149 | 11/1929 | Dunmire | 285/912 |
| 2,337,897 | 12/1943 | Jimerson | 285/278 |
| 2,411,235 | 11/1946 | Smith . | |
| 2,530,523 | 11/1950 | Hittl . | |
| 2,645,907 | 7/1953 | Droste . | |
| 2,723,790 | 11/1955 | Spiess . | |
| 2,795,985 | 6/1957 | Wilson | 285/38 |
| 2,808,749 | 10/1957 | Lampke | 81/57.13 |
| 2,907,242 | 10/1959 | Chakroff | 285/912 |
| 3,037,796 | 6/1962 | Robb | 285/912 |
| 3,175,293 | 3/1965 | Bordon | 415/92 |
| 3,270,417 | 9/1966 | Stram | 415/92 |
| 3,427,048 | 2/1969 | Brown | 285/18 |
| 3,645,291 | 2/1972 | Finney . | |
| 3,799,218 | 3/1974 | Douglass . | |
| 3,875,980 | 4/1975 | Getz . | |
| 4,064,771 | 12/1977 | Krieg | 81/57.44 |
| 4,120,332 | 10/1978 | Davis . | |
| 4,153,083 | 5/1979 | Imler . | |
| 4,351,372 | 9/1982 | Delgado . | |
| 4,446,895 | 5/1984 | Kato . | |
| 4,487,434 | 12/1984 | Roche | 285/912 |

FOREIGN PATENT DOCUMENTS

| | | | |
|---|---|---|---|
| 704681 | 3/1965 | Canada | 285/912 |
| 707988 | 4/1954 | United Kingdom | 285/39 |
| 735582 | 8/1955 | United Kingdom | 279/1 K |
| 862673 | 3/1961 | United Kingdom | 285/912 |
| 1041499 | 9/1966 | United Kingdom | 285/912 |
| 832228 | 5/1981 | U.S.S.R. | 285/912 |

Primary Examiner—Cornelius J. Husar
Assistant Examiner—Eric K. Nicholson
Attorney, Agent, or Firm—William H. Eilberg

[57] ABSTRACT

An automated cylinder connector is disclosed, which substantially reduces the time required to connect and disconnect a gas line from a gas cylinder. In one embodiment, a threaded connector, defining a conduit for gas flow, is designed to be attached to the valve outlet of a gas cylinder. The connector includes a threaded collar having a bevel gear which engages a similarly shaped bevel gear on an independent, motorized drive member. When the drive member is held against the threaded connector, so that the bevel gears are engaged, and when power is applied to the drive member, the collar on the connector rotates, and is threadedly engaged with the gas cylinder. In another embodiment, the threaded connector takes the form of a turbine which is rotated by a stream of compressed air. Rotation of the turbine screws the connector into the gas cylinder. In both embodiments, a plurality of threaded connectors can be grouped together, and suspended above a plurality of cylinders, by a set of springs. When one of the cylinders is to be filled, one of the threaded connectors is pulled down and attached to the cylinder as described above.

15 Claims, 7 Drawing Figures

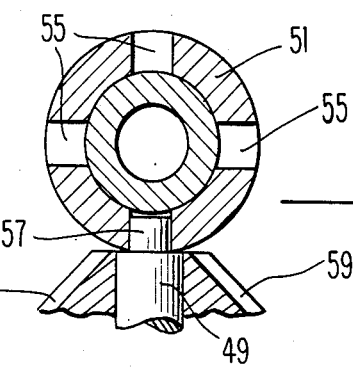
_Fig. 4_
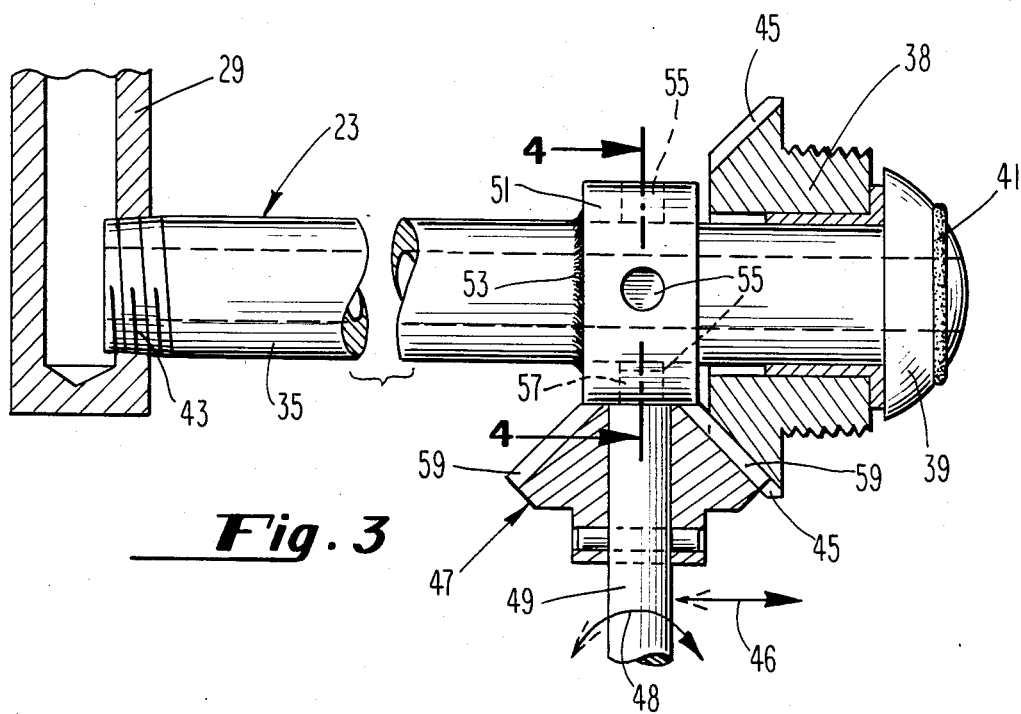
_Fig. 3_
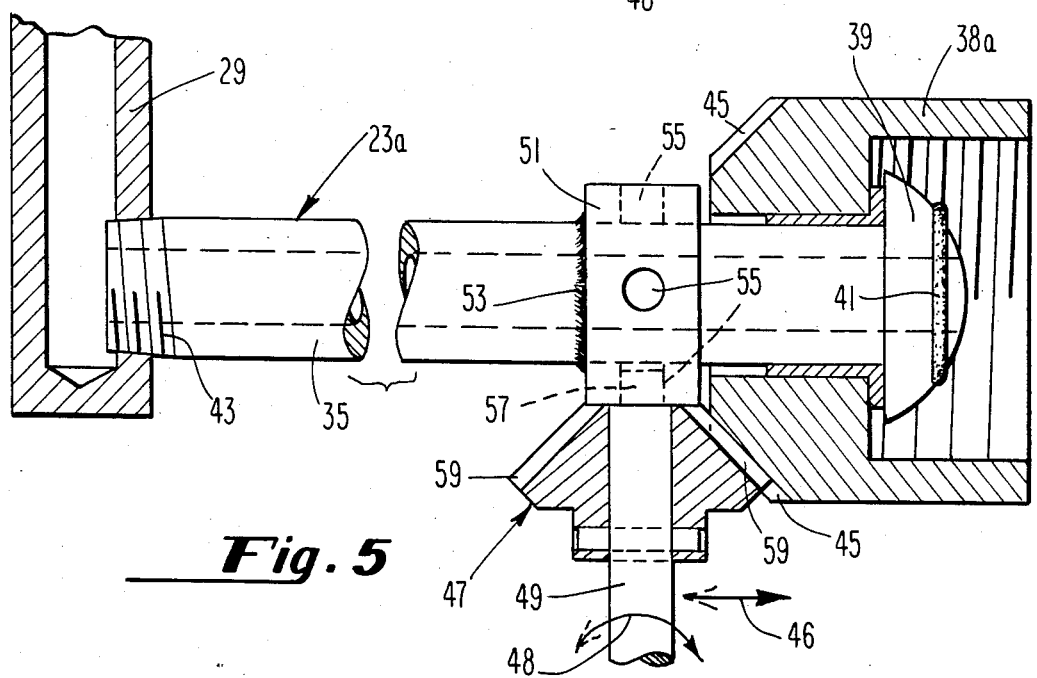
_Fig. 5_

AUTOMATED CYLINDER CONNECTOR

BACKGROUND OF THE INVENTION

The present invention relates to the field of filling and/or emptying of gas cylinders. The invention provides a novel apparatus and method of filling such cylinders, wherein the time required for filling is substantially reduced. The invention also reduces or eliminates the dangers associated with insufficient tightening or overtightening of cylinder connectors.

It is common practice to use pressurized cylinders to store and distribute various industrial gases, such as oxygen, nitrogen, argon, etc. Such cylinders contain relatively small quantities of gas, to accommodate the varying needs of customers. A substantial component of the cost of distribution of the gases is the labor required to fill each cylinder.

Because the gases mentioned above are held at high pressure, they can be dangerous if not handled properly. For this reason, the Compressed Gas Association (CGA) publishes standards for the valves used on gas cylinders, and for their associated connectors. For example, differently shaped connectors are used for different gases, to prevent the accidental connection of one type of gas to a cylinder intended for another type of gas. Also, the standards require the use of right-handed threads for connectors used for non-flammable gases, while left-handed threads are used for flammable gases.

Adherence to the above standards helps to insure that the connection of the gas source to the gas cylinder will be secure. But no safety standard can serve its purpose if the connection is not properly made. Thus, if the connector is not tightened sufficiently, there is a likelihood of gas leakage. And if the connector is overtightened, the threads on the connector can be damaged.

In general, the cylinder valves used in the prior art include a threaded connector, either male or female, which is adapted to receive the threaded end of a flexible but airtight hose. The threaded connector includes a central spud which defines a channel for gas flow, and a threaded collar, disposed around the spud, for providing the threaded engagement with the cylinder valve. The threaded collar must be tightened securely onto the cylinder connector. In the prior art, it has been necessary to tighten the collar manually, either by turning a handwheel attached to the threaded connector, or by the use of a wrench adapted to turn a hex nut.

The safety precautions necessary in handling compressed gases increase the time required to fill gas cylinders, especially when a large number of cylinders are to be filled. Each threaded connector must first be tightly engaged with the cylinder valve connector before filling can begin. After the filling is completed, the connector must be unscrewed, requiring almost the same amount of time and effort.

The prior art contains many examples of methods and apparatus for filling gas cylinders. However, the prior art known to applicant deals only with the filling operation, but not the process of connecting a filling hose to the cylinder. For example, U.S. Pat. No. 4,153,083 discloses a regulated system for filling a plurality of gas cylinders. U.S. Pat. No. 4,446,895 shows an apparatus for filling a gas cylinder, the apparatus including a piston means disposed within the cylinder for controlling the introduction of gas into the cylinder. U.S Pat. No. 3,799,218 shows apparatus for dispensing compressed gas at predetermined pressure and volume. U.S. Pat. No. 2,411,235 discloses apparatus for filling gas cylinders, the apparatus being partly automated, and being capable of portable use. U.S. Pat. No. 2,645,907 shows apparatus for filling a plurality of gas cylinders with measured quantities of gas. U.S. Pat. No. 2,530,523 shows apparatus for filling of gas cylinders, the apparatus providing improved control in the "topping off" portion of the cylinder filling cycle. All of the disclosures of the above-cited patents are incorporated herein by reference.

The present invention discloses an apparatus which greatly facilitates the connection of a gas line to a cylinder valve. Use of the present invention can reduce the time required for connection of the line to the cylinder by up to 80%. The invention is designed to operate with virtually all standard gas cylinder connectors. Thus, the invention can be used in conjunction with most, if not all, of the devices described in the patents cited above. The invention also includes a method of automatic gas cylinder connection.

SUMMARY OF THE INVENTION

In a first embodiment of the present invention, a plurality of hoses or lines carrying compressed gas terminate in threaded connectors. The threaded connectors can be either male or female, depending on whether the corresponding cylinder valve has a female or male construction. The threaded connectors are grouped together, and are suspended above a plurality of gas cylinders to be filled. Each connector has a threaded collar member which is adapted for threaded engagement with the valve outlet of each gas cylinder. The collar member also has a bevel gear which is adapted for engagement with a similar bevel gear on a motorized drive member. The drive member is independent, hand-operated, and provides rotational motion in both the forward and reverse directions. After the male connector has been guided, by hand, into the general vicinity of the cylinder valve outlet, the drive member is held against the collar member, such that the bevel gears are engaged, and power is applied to the drive member. The resulting torque causes rotation of the threaded collar, and causes the connector to be engaged with the gas cylinder valve. After the filling is completed, the drive member is operated in reverse, and the connector is thereby unscrewed from the gas cylinder.

In a second embodiment, the threaded connector comprises a turbine which is operated by compressed air. A single block of material, preferably metal, defines a channel for incoming gas, and also defines alternate channels for compressed air to drive the turbine in the forward and reverse directions. The turbine has a threaded portion at the end nearest the cylinder. This threaded portion, as in the first embodiment, is adapted for engagement with a male or female cylinder connector. After the end of the threaded connector (i.e., the end of the turbine) is guided into the vicinity of the cylinder valve outlet, a switch is manually actuated, causing compressed air to drive the turbine, in the forward direction, and thereby causing the threaded connector to be tightly screwed into the cylinder valve. When the switch is actuated in the reverse position, the turbine rotates in the opposite direction, unscrewing the connector.

In both embodiments, a plurality of threaded connectors are grouped together within a protective cage, and are held in a raised position by a set of springs. A pallet load of cylinders to be filled is brought under the threaded connectors, and each connector, as needed, is pulled down and guided into the vicinity of each cylinder valve. Power is then applied, as described above, to engage the connectors with the cylinders.

It is therefore an object of the present invention to provide apparatus for automatic connection and disconnection of a gas line from a gas cylinder.

It is another object of the invention to reduce substantially the time required for filling of gas cylinders.

It is another object of the invention to increase the reliability of the filling operation by reducing the probability of overtightening or undertightening of the gas cylinder connectors.

It is another object of the invention to provide apparatus as described above, which apparatus provides a ready indication that the threads on a connector are damaged.

It is another object of the invention to provide a structure for filling a group of cylinders, located in the same general area, almost simultaneously.

It is another object of the invention to provide apparatus as described above, wherein a single housing defines a gas supply means and a mechanized connector means.

It is another object of the invention to provide apparatus as described above, wherein the apparatus can be used with virtually any type of threaded cylinder connector.

It is another object of the invention to provide a method for rapidly connecting and disconnecting a gas line to and from a gas cylinder.

It is another object of the invention to provide a method for rapid filling of a plurality of gas cylinders.

Other objects and advantages of the invention will be apparent to those skilled in the art, from a reading of the following brief description of the drawings, the detailed description of the invention, and the appended claims.

BRIEF DESCRIPTION OF THE DRAWINGS

FIG. 3 is a cross-sectional view showing a male cylinder connector, constructed according to the present invention, and a motorized drive member held against the connector.

FIG. 4 is a cross-sectional view, taken along the line 4—4 of FIG. 3.

FIG. 5 is a cross-sectional view, similar to FIG. 3, showing a female cylinder connector constructed according to the present invention.

DETAILED DESCRIPTION OF THE INVENTION

Figure 1:
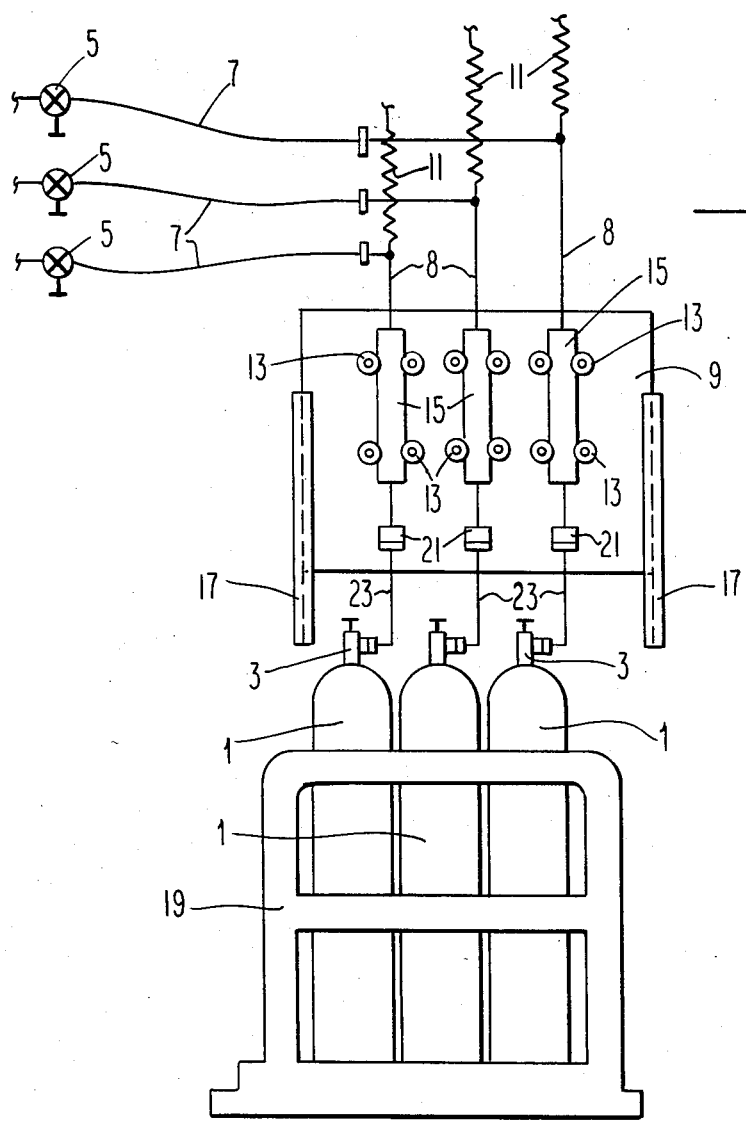
FIG. 1 is a partially schematic, side elevational view showing a plurality of connected to a set of gas lines.

FIG. 1 illustrates a group of cylinders being filled according to the present invention. Gas cylinders 1, having standard cylinder valves 3, are disposed on pallet 19. Only three cylinders 1 are visible in the figure, but it is understood that larger numbers of cylinders can be handled at one time. Gas is supplied to the cylinders through flexible tubes 7, the gas flow being controllable by shut-off valves 5. Tubes 7 terminate at, and communicate with, pipes 8. The pipes 8 are disposed to move vertically, against the force of springs 11, and are guided by slides 15, which are mounted to move within rollers 13. The pipes terminate in swivel joints 21, the swivel joints being connected to threaded connectors 23. The swivel joints permit the threaded connectors to rotate about a vertical axis. The threaded connectors are adapted to be screwed into or over cylinder valves 3, which are correspondingly threaded.

The entire assembly of slides 15, rollers 13, and swivel joints 21 is enclosed within protective cage 9. Guards 17 are slidable over the cage 9 to provide further protection for the operator of the system while the cylinders are being filled.

Figure 2:
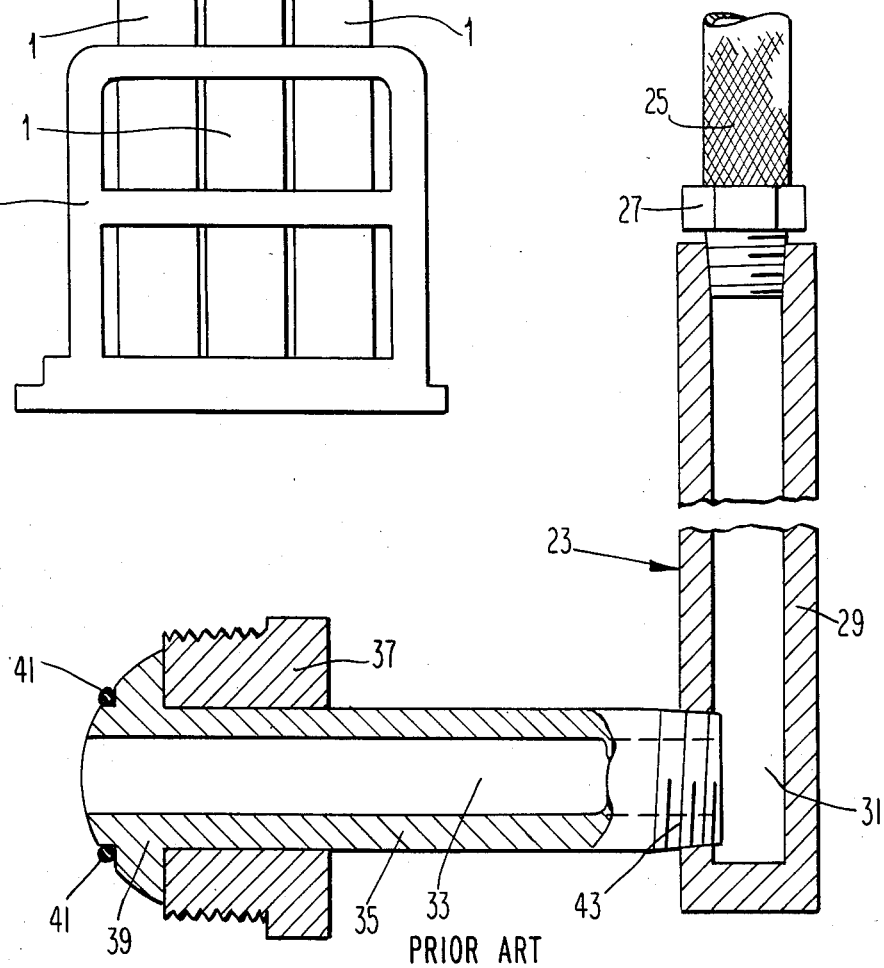
FIG. 2 is a cross-sectional view showing a male cylinder connector of the prior art, the connector being adaptable for use in the present invention.

FIG. 2 is a detailed view of a threaded connector 23, constructed according to the prior art. This connector 23 is male, and can be used as indicated in FIG. 1. If the cylinder valve is male, then connector 23 would be replaced with a female connector. The connector shown in FIG. 2 can be modified to practice the present invention, as will be described later. The prior art connector of FIG. 2 includes braided hose 25, the hose being formed of a strong metal braid. The hose is connected, with threaded plug 27, to conduit 29. Conduit 29 defines gas channel 31, through which incoming gas can flow.

Spud 35 is screwed into the conduit 29, by threads 43, such that the gas channel 31 in conduit 29 communicates with gas channel 33 in the spud. Spud 35 has a head 39 and an O-ring seal 41. Disposed around the spud, and adjacent to head 39 is threaded collar 37. The collar is rotatable about the spud; such rotation of the collar causes the collar, and the entire connector as well, to be screwed into a corresponding female connector (not shown) of a gas cylinder. Collar 37 is shaped to fit into a female cylinder connector of a particular standard design. If the cylinder connector is male, then the threaded connector 23 would be female.

FIG. 3 illustrates a threaded male cylinder connector, made according to the present invention. The connector shown in FIG. 3 is a modification of that shown in FIG. 2, and similar elements are designated by similar reference numerals. Shown in the figure are threaded male connector 23, including a portion of conduit 29, and spud 35. The spud has a threaded collar 38, but unlike the collar 37 of FIG. 2, collar 38 includes a bevel gear 45 for engagement with a drive member, described below. Also mounted on the spud, adjacent to threaded collar 37, is a ring 51. The ring can be welded to the spud, as indicated by reference numeral 53, or it can be soldered. The ring can also be attached to the spud by a setscrew, or by a snap ring, as long as it is firmly anchored on the spud, and cannot rotate relative thereto.

FIG. 3 also illustrates drive member 47. The drive member is independent of the threaded male connector, and is brought to the vicinity of the male connector only when it is necessary to connect or disconnect the gas line from the cylinder. The drive member comprises a bevel gear 59 mounted on shaft 49. The shaft is rotatable about its axis, as indicated by arrow 48, and is connected to a suitable source of rotational power (not shown). Bevel gear 59 is adapted to engage bevel gear 45 on collar 38, such that rotation of shaft 49 causes rotation of collar 38 around the axis of the spud. Plug 57 extends from drive member 47, and is inserted into one of several holes 55 in ring 51.

In the preferred embodiment, the bevel gears are beveled at an angle of 45°. However, other angles could be chosen, as long as the bevel gears 45 and 59 engage each other.

Holes 55 are also illustrated in FIG. 4, which shows a cross-sectional view of the ring 51. FIG. 4 also clearly illustrates the insertion of plug 57 into one of the holes 55. In the embodiment depicted in FIGS. 3 and 4, the holes are disposed at 90° intervals around ring 51. The holes could be spaced at different intervals, and the number of holes could therefore be greater or smaller than four. By having at least four holes, it is almost certain that one hole will be in a convenient position for receiving the plug 57, and that it will not be necessary to tilt the drive member into an awkward posi- tion.

When power is applied to the drive member 47, shaft 49 rotates around its axis, as indicated by arrows 48. The engagement of bevel gears 59 and 45 causes threaded collar 38 to rotate, using the spud 35 as a bearing. Rotation of the collar causes the entire connector to be screwed into the female connector of the gas cylinder (not shown). While the connector is being screwed into the cylinder valve, the entire connector assembly moves to the right, as indicated by the solid portion of arrow 46, but gears 59 and 45 remain engaged, because the drive member is firmly held within the ring by plug 57. Thus, although the assembly moves to the right, the drive member 47 remains stationary with respect to the assembly. The same is true when the connector is unscrewed. The assembly moves to the left, as indicated by the dotted portion of arrow 46, but the drive member 47 remains stationary with respect to the assembly.

Because of the use of the motorized drive member, the likelihood of insufficient tightening or overtightening of the connector is greatly reduced. If the drive member is equipped with a standard clutch which controls the torque produced, each application of the drive member will result in virtually the same degree of tightness. Thus, the danger of leakage of gas, due to undertightening, and the danger of damage to the threads, due to overtightening, are substantially eliminated.

Failure of the connector to be tightened properly, upon application of a standard torque, is a sign that the connector threads are damaged. Thus, the present invention provides the operator of the system with a quick and easy way of determining the condition of the threads.

FIG. 5 illustrates a variation of the invention, wherein the threaded connector is female, and wherein the cylinder valve connector (not shown) is male. FIG. 5 is similar to FIG. 3, and similar elements are designated by the same reference numerals. The threaded connector is labeled by reference numeral 23a, to reflect the fact that this connector is female. The threaded collar 38 of FIG. 3 is replaced by threaded collar 38 which fits around head 39 of spud 35, and is adapted to be screwed onto the male portion of the cylinder valve (not shown).

Figure 7:
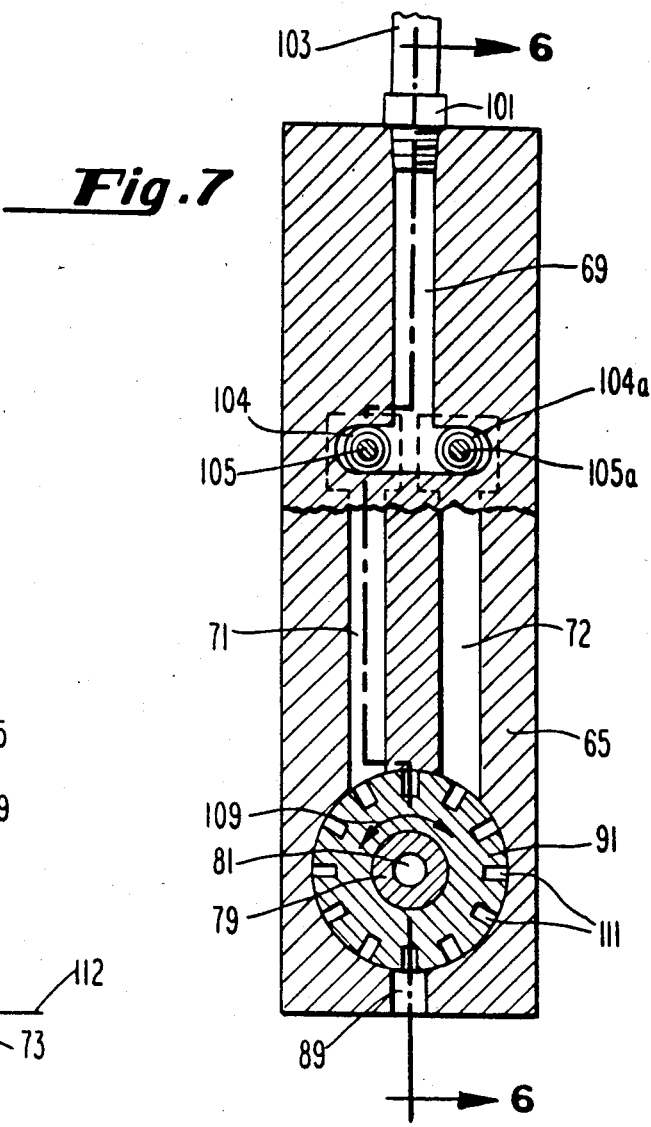
FIG. 7 is a cross-sectional view, taken along the line 7—7 of FIG. 6.
Figure 6:
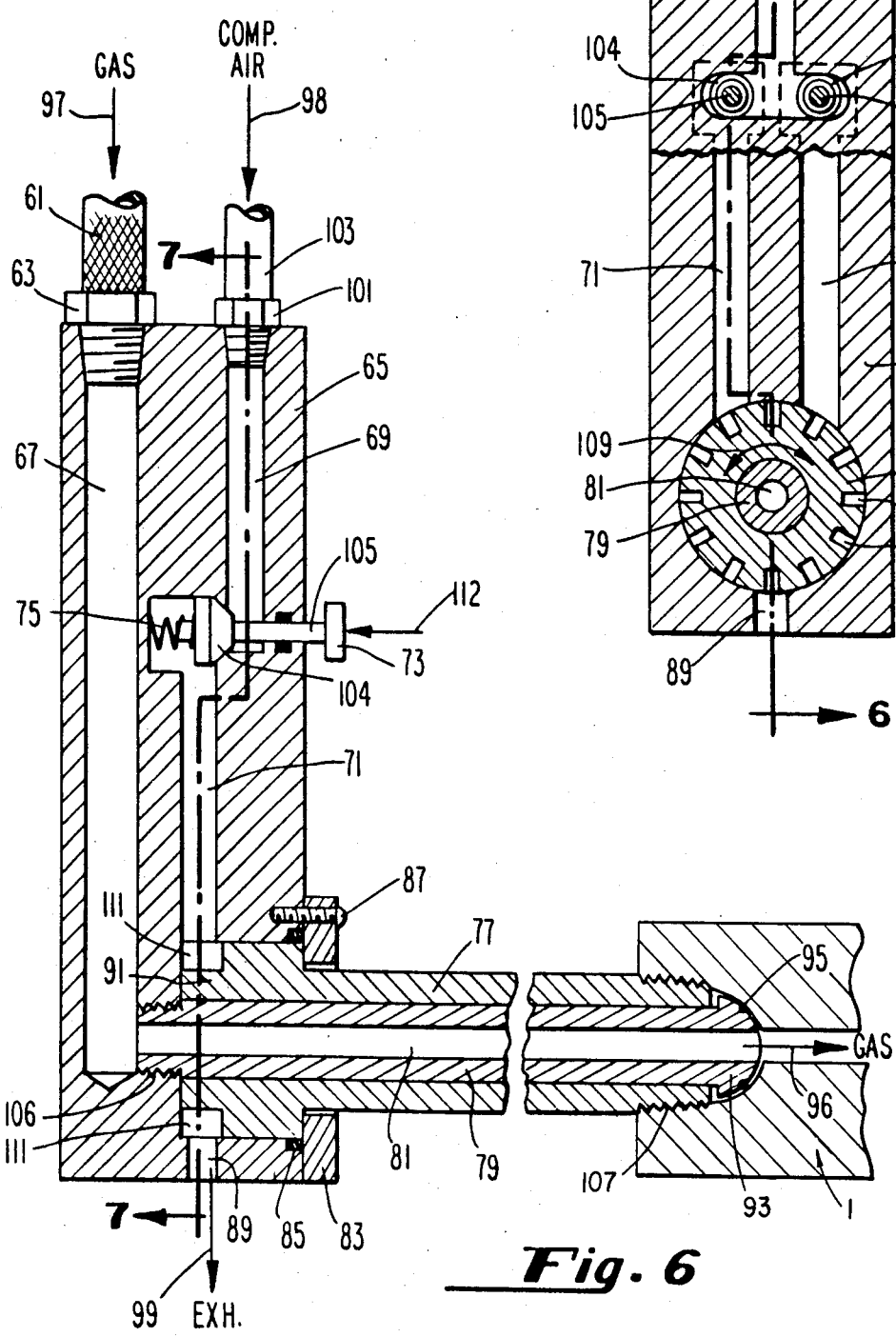
FIG. 6 is a cross-sectional view of an alternative embodiment of the invention, wherein the threaded cylinder connector comprises a turbine driven by compressed air, FIG. 6 being taken along the line 6—6 of FIG. 7.

An alternative embodiment of the invention is illustrated in FIGS. 6 and 7. In this embodiment, the threaded collar comprises a turbine which is driven by compressed air, and which rotates around the spud. The threaded connector shown on the turbine is male, but a female connector could be formed from the turbine in a manner similar to that of the first embodiment.

The connector apparatus comprises block 65, which preferably is made of steel, but which can also be formed of another hard material. The steel block has bores formed therein to provide channels for fluid flow. Gas channel 67 provides a path for entry of gas, which flows through braided hose 61, as indicated by arrow 97. The braided hose is connected to channel 67 in steel block 65 by threaded connector 63. The threaded connector and braided hose are of similar construction to those shown in the embodiment described above.

Steel block 65 also defines air channel 69, as well as air channels 71 and 72, the latter channel being visible only in FIG. 7. Pipe 103 is connected to a source of compressed air (not shown). The compressed air flows in the direction indicated by arrow 98, and the pipe is connected to air channel 69 by threaded connector 101. The compressed air, which may be at a pressure of about 100 psig, drives the turbine, as will be described in more detail below.

As in the previous embodiment, the apparatus comprises a spud 79 having threads 106 for connection to steel block 65. Spud 79 defines gas channel 81 which communicates with gas channel 67, to complete the path for flow of gas into the cylinders to be filled (not shown). The gas flows in the direction indicated by arrow 96. As in the previous embodiment, spud 79 has a head 93 and an O-ring seal 95.

Mounted upon spud 79 is turbine 77, which has threads 107 for attachment to a female connector of a gas cylinder. The turbine 77 includes turbine wheel 91, more clearly shown in FIG. 7, the wheel having a plurality of recesses 111 for catching air and causing rotation of the turbine in the directions indicated by arrow 109. The turbine 77 is freely rotatable around the spud 79, and is held firmly inserted into steel block 65 by retaining ring 83 and bolt 87. Seal 85 prevents leakage of the gas.

Turbine 77 therefore performs functions analogous to those performed by threaded collar 38 of FIG. 3. The threads 107 permit the turbine to be screwed into the gas cylinder, in similar fashion to that of the threads of the collar. The turbine wheel 91 provides engagement of the turbine with a source of rotary motion, just as the bevel gear 45, in FIG. 3, provides engagement of the collar with the drive member.

Compressed air can be directed through either channel 71 or channel 72, causing the turbine 77 to rotate in either the forward or reverse directions, respectively. Air driving the turbine leaves the system through exhaust channel 89. The path followed by the compressed air depends on the setting of a pair of buttons, only one of the buttons, designated by 73, being being visible in FIG. 6. Button 73 is connected, by pin 105, to air valve 104, the valve being biased by spring 75. In the position shown in FIG. 6, the air is trapped in channel 69, and cannot enter channel 71. When button 73 is depressed, as indicated by arrow 112, air can flow into channel 71, tending to cause the turbine to rotate in the forward direction, i.e. so as to screw the connector into the cylinder. The other button, not visible in FIG. 6 but having pin 105a and valve 104a, shown in FIG. 7, operates in a similar fashion to control the flow of air into channel 72.

The operation of the first embodiment of the invention can now be described. A plurality of gas cylinders is brought to the vicinity of a plurality of threaded male or female connectors, as shown in FIG. 1. The cylinder connectors have the structures shown in FIGS. 3 or 5.

The operator of the system manually pulls one or more threaded connectors down, against the force of springs 11, and guides the connectors into the corresponding openings of the female or male cylinder valve connectors (not shown). The threaded connectors can be easily rotated, due to the flexibility of the swivel joints 21, in order to guide them to the cylinders. In most cases, it is therefore unnecessary to rotate the cylinder to align it with the threaded connector.

A drive member, such as is shown by reference numeral 47 of FIG. 3, is then held against the threaded connector, by inserting the plug 57 of the drive member into the nearest hole 55 of ring 51. Power is then applied to the drive member, causing the threaded collar 38 to rotate, and thereby screwing the connector into or onto the gas cylinder. The operation is repeated for each cylinder to be filled. Gas is then allowed to flow into the cylinders, through the hoses, pipes, and connectors shown.

When it is desired to disconnect the gas line from a filled cylinder, the cylinder valve is closed, and a drive member is again inserted into ring 51. The drive member is energized in the reverse direction, and the threaded connectors are thereby unscrewed. The connector is released, and returns to its original position within protective cage 9, due to the action of springs 11. The connector, when not in use, therefore does not interfere with the cylinder handling operation until it is needed again.

For maximum efficiency, it is desirable that a separate power source be provided for each drive member. Several operators can therefore hold the drive members in position, and can actuate them independently to connect and disconnect the gas lines from the cylinders. However, the drive members could be connected to a common power source, with a corresponding decrease in flexibility.

The efficiency of operation can be further increased by providing a plurality of groups of threaded connectors, each group suspended within its own protective cage. A conveyor or roller arrangement can be used to move pallets of cylinders into position under the respective groups of connectors. In this manner, a large number of cylinders can be connected and disconnected from the gas lines quite rapidly.

In operation of the embodiment of FIGS. 6 and 7, the apparatus is again guided manually into the general vicinity of the opening of the cylinder valve connector (not shown). The forward button is depressed, causing the turbine to rotate, and causing the connector to be screwed into the cylinder as before. The process is reversed by actuating the reverse button. The other aspects of the operation are similar to those of the first embodiment.

It is apparent that the objects of the invention are fulfilled by the above disclosure. It is understood that the invention can be modified in various ways. The configuration of the threaded connectors can be changed to accommodate different types of cylinder valve connectors, for example. The precise configuration of the turbine control buttons in FIGS. 6 and 7 can also be varied. For example, a single button could be used to control a two-way valve to channel compressed air into one of two paths. The number of cylinders and threaded connectors used at one time can also be changed, as suggested above. These and other modifications are to be deemed within the spirit and scope of the following claims.

What is claimed is:

1. Apparatus for connecting a fluid line to a cylinder, comprising:
    (a) block means defining a first conduit means, for directing a fluid to the cylinder, the first conduit means having a threaded opening,
    (b) second conduit means, having a threaded end for engagement with the first conduit means, the second conduit means inserted into the block means by threaded engagement with the first conduit means, such that fluid can flow from the first conduit means to the second conduit means, the first and second conduit means being non-parallel with respect to each other,
    (c) the second conduit means having a head means at the end opposite its threaded end, the head means having a diameter larger than that of the second conduit means, and
    (d) turbine means, the turbine means being generally cylindrical and extending along substantially the entire length of the second conduit means, and being mounted for rotation around the second conduit means, the end of the turbine means nearest the head means being threaded, wherein threaded engagement and rotation of the turbine means into the cylinder urges the head means towards the cylinder,
    (e) the turbine means being powered by compressed fluid delivered through a passage formed in the block means.

2. Apparatus for connecting a fluid line to a cylinder, comprising:
    (a) conduit means, for directing a fluid to the cylinder, the conduit means having a head means with a diameter larger than that of the conduit means, the head means being adapted for sealing abutment with the cylinder,
    (b) turbine means, the turbine means being generally cylindrical and being coaxial with, and extending along substantially the entire length of, the conduit means, the turbine means being mounted for rotation around the conduit means, the end of the turbine means nearest the head means being threaded, wherein threaded engagement and rotation of the turbine means into the cylinder urges the head means towards the cylinder, and
    (c) means for supplying compressed fluid to drive the turbine means.

3. The apparatus of claim 2, further comprising valve means for reversing the direction of the compressed fluid, wherein the conduit can be connected and disconnected to the cylinder according to the direction of flow of the compressed fluid.

4. Apparatus for connecting a fluid line to a cylinder, comprising a conduit means, the conduit means having a head portion, the head portion having a diameter larger than that of the conduit means, and a turbine means, the turbine means extending along substantially the entire length of the conduit means and being mounted for rotation around the conduit means, the turbine means having a threaded portion near the head portion of the conduit means, and compressed fluid drive means for rotating the turbine means, wherein threaded engagement and rotation of the turbine means urges the head portion towards or away from the cylinder.

5. Apparatus for connecting a fluid line to a cylinder, comprising:

(a) first conduit means, connectable to a source of fluid, the first conduit means having a threaded opening, (b) second conduit means, having a threaded end in engagement with the first conduit means, such that there is a fluid path for flow from the first conduit means to the second conduit means, the first and second conduit means being non-parallel with respect to each other, (c) the second conduit means having a head means at the end opposite its threaded end, the head means having a diameter larger than that of the second conduit means, (d) ring means, non-rotatably mounted on the second conduit means, and spaced away from the head means, the ring means having at least one hole, (e) collar means, the collar means being mounted for rotation around the second conduit means, the collar means being mounted between the ring means and the head means, (f) the collar means having a threaded portion for engagement with the cylinder, the collar means also having a bevel gear portion, and (g) drive means, the drive means including a bevel gear, for engagement with the bevel gear portion of the collar means, the bevel gear of the drive means being connected for rotation by a shaft, the drive means including a plug means for insertion into the hole in the ring means, wherein threaded engagement of the threaded portion of said collar means with said cylinder and rotation of the shaft causes the second conduit means to be threaded into the cylinder.

6. The apparatus of claim 5, wherein the threaded portion of the collar means is disposed on the outer surface of the collar means, whereby the collar means comprises a male connector.

7. The apparatus of claim 5, wherein the threaded portion extends beyond the head means, and wherein the threaded portion of the collar means is disposed on the inner surface of the collar means, whereby the collar means comprises a female connector.

8. The apparatus of claim 6, wherein the head means includes seal means for sealing the head means to the cylinder.

9. The apparatus of claim 7, wherein the head means includes seal means for sealing the head means to the cylinder.

10. The apparatus of claim 5, wherein the bevel gear portion of the collar means is integrally formed with the collar means.

11. Apparatus for connecting a fluid line to a cylinder, comprising:
(a) conduit means, having a head means with a diameter larger than that of the conduit means, the head means being adapted for sealable insertion into the cylinder, (b) ring means, non-rotatably mounted on the conduit means, and spaced away from the head means, the ring means having at least one hole, (c) collar means mounted for rotation around the conduit means, the collar means being mounted between the ring means and the head means, (d) the collar means having a threaded portion for engagement with the cylinder, and a geared portion for engagement with a drive means, (e) the drive means including gear means for engagement with the geared portion of the collar means, the drive means including a plug means for insertion into the hole in the ring means, wherein threaded engagement of the threaded portion of said collar means with said cylinder and rotation of the drive means causes the conduit means to be threaded into the cylinder.

12. The apparatus of claim 11, wherein the threaded portion of the collar means is disposed on the outer surface of the collar means, whereby the collar means comprises a male connector.

13. The apparatus of claim 11, wherein the threaded portion of the collar means extends beyond the head means, and wherein the threaded portion is disposed on the inner surface of the collar means, whereby the collar means comprises a female connector.

14. Apparatus for connecting a fluid line to a cylinder, comprising a conduit means having a head portion and a ring means, the head portion having a diameter larger than that of the conduit means, the ring means being non-rotatably mounted to the conduit means and spaced apart from the head portion, and a collar means, the collar means being disposed for rotation around the conduit means, the collar means being mounted between the head portion and the ring means, the collar means including threaded means for engagement with the cylinder, the collar means also including gear means for engagement with a drive means, and wherein the ring means includes means for anchoring the drive means when the drive means is in engagement with the gear means.

15. The apparatus of claim 14, wherein the anchoring means comprises at least one hole in the ring means, the hole being adapted to receive a plug protruding from the drive means.

* * * * *